United States Patent [19]

Chang

[11] 4,392,482
[45] Jul. 12, 1983

[54] SOLAR HEATING PANEL ARRANGEMENT

[76] Inventor: Moo K. Chang, 11979 Iowa St., Los Angeles, Calif. 90025

[21] Appl. No.: 267,346

[22] Filed: May 26, 1981

Related U.S. Application Data

[63] Continuation-in-part of Ser. No. 73,644, Sep. 10, 1979, abandoned.

[30] Foreign Application Priority Data

Aug. 2, 1979 [KR] Rep. of Korea .................. 372/1979

[51] Int. Cl.³ ............................................... F24J 3/02
[52] U.S. Cl. .................................. 126/440; 126/438; 126/444; 126/450
[58] Field of Search ............... 126/438, 439, 440, 451, 126/432, 444, 450

[56] References Cited

U.S. PATENT DOCUMENTS

| 1,093,498 | 4/1914 | Thring ................................. 126/440 |
| 1,302,363 | 4/1919 | Graham ............................. 126/440 |
| 3,145,707 | 4/1958 | Thomason .......................... 126/271 |
| 3,587,559 | 6/1971 | Nonaka ............................... 126/271 |
| 3,866,285 | 2/1975 | Clark ................................. 29/157 R |
| 3,929,121 | 12/1975 | Rogers ............................... 126/271 |
| 3,985,116 | 10/1976 | Kapany ............................... 126/270 |
| 3,998,204 | 12/1976 | Fuchs et al. ........................ 126/270 |
| 4,033,324 | 7/1977 | Eckels ................................. 126/440 |
| 4,056,093 | 11/1977 | Barger ................................ 126/440 |
| 4,059,094 | 11/1977 | Barrio de Mendoza ............ 126/271 |
| 4,078,548 | 3/1978 | Kapany ............................... 126/271 |
| 4,111,186 | 9/1978 | Ross et al. .......................... 126/271 |
| 4,137,899 | 2/1979 | Weslow .............................. 126/440 |
| 4,151,829 | 5/1979 | Wilson ............................... 126/438 |
| 4,284,068 | 8/1981 | Gunderson ......................... 126/438 |

FOREIGN PATENT DOCUMENTS

| 2644050 | 4/1977 | Fed. Rep. of Germany ...... 126/440 |
| 55-30994 | 10/1970 | Japan ................................. 126/440 |

Primary Examiner—James C. Yeung
Attorney, Agent, or Firm—Nilsson, Robbins, Dalgarn, Berliner, Carson & Wurst

[57] ABSTRACT

A solar heating panel arrangement and method wherein a plurality of spherical lenses transmit and focus solar radiation onto the upper surface of a fluid passage for various relative positions of the sun. The upper surface of the passage is in heat transfer proximity to the fluid therein, causing solar radiation focused thereon to be transferred to the fluid in the form of heat. Solar radiation not directly incident on the lenses may be reflected onto them to increase the amount of solar energy available for transfer to the fluid. A supplementary insulating flow of fluid may also be provided above the passage to absorb heat passing upwardly therefrom and retain the heat within the system.

24 Claims, 10 Drawing Figures

SOLAR HEATING PANEL ARRANGEMENT

This is a continuation-in-part of application Ser. No. 73,644, filed Sept. 10, 1979, new abandoned.

BACKGROUND OF THE INVENTION

This invention relates generally to the solar heating art and more particularly to a novel solar heating panel arrangement and method wherein solar radiation is focused by a plurality of spherical lenses for transfer to a fluid in the form of heat.

There have heretofore been proposed several types of solar heating panels for absorbing energy from the sun and transferring it to a fluid passed through the panels. The heated fluid may generally be either a fluid such as water for consumption in a heated state or a recirculating fluid fo transfer of thermal energy from the solar panel to another device. In cases where consumable fluid is heated, the fully heated fluid may be passed to an insulated reservoir for storage until needed.

Prior solar heating panels often incorporate a plurality of fluid-carrying pipes or other conduits directly exposed to the sun's radiation. A portion of the incident radiation is thus absorbed by the pipes in the form of heat, and a portion of that heat is transferred to the fluid. While panels of this type cause the temperature of the fluid to increase, the efficiency of such panels suffers substantially from limitations on heat transfer between the pipes and the fluid passing therethrough. Since the amount of heat transferred from one element to another is directly related to the temperature gradient between the two elements, heat transfer from pipes uniformly heated by the sun is limited by the relatively low uniform pipe temperatures obtainable through solar irradiation. Solar panels of this type may also be limited in efficiency by an inherent dependence of their operating characteristics on the relative position of the sun. As the sun moves across the sky through the course of a day, the amount of solar radiation reaching the pipes or other conduits may fall far below the desired level.

Tracking mechanisms have been proposed for changing the orientation of solar panels during the day to follow the sun as it crosses the sky, however, such mechanisms are themselves wasteful of energy and considerably complicate solar heating systems.

U.S. Pat. No. 1,093,498 issued to Thring discloses a solar heating panel having an array of spherical lenses projecting into hemispherical recesses formed in the upper surface of a water tank and separated from the surfaces of the recesses by a relatively small distance. Solar radiation incident on the spherical lenses is directed onto the surfaces of the hemispherical recesses for the various positions of the sun. However, the volume of water in the tank is substantial and the flow path near the top of the tank is relatively obstructed, causing the fluid flow rate past many points in the tank to be very slow. At those points, heated fluid would tend to remain near the location at which it picked up its heat, reducing the temperature differential between the recesses and the fluid. The rate of heat transfer would thus be reduced, as well.

U.S. Pat. No. 4,056,093 issued to Barger discloses a solar heater having a single spherical lens positioned over a thin hemispherical flow passage for heating a fluid therein. The lens is positioned under a transparent hemispherical cover which insulates the lens assembly against heat dissipation to the atmosphere. However, any cover of the type disclosed would permit substantial amounts of heat to be lost.

In addition, each lens of the Thring and Barger patents is able to produce only a single heated area on the corresponding hemispherical surface, that area representing the solar radiation which is directly incident on the lens. The amount of heat transferred to the fluid is thus severely limited by the size of the lenses used.

Therefore, it is desirable to provide a solar heating panel able to more efficiently convert incident solar radiation to usable thermal energy stored in a fluid.

SUMMARY OF THE INVENTION

Briefly, the present invention comprises a solar heating panel arrangement having a plurality of spherical lenses for transmitting and focusing solar radiation and a fluid passage structure having upper and lower spaced apart boundary portions defining a series of relatively thin hemispherical fluid passages, the upper boundary portion or portions being in heat transfer proximity to fluid within the passage and having upper surfaces which include the focal points of the spherical lenses for solar radiation of various directions. Solar radiation incident on the lenses is thus focused on the upper surface portions to heat those portions and be transferred to the fluid within the passage in the form of heat.

The spaces between the lenses and the respective upper surfaces are preferably closed and may be covered by a substantially flat transparent heat insulating member engaging the lenses along meridians thereof.

Structures are preferably provided to reflect additional solar radiation onto the lenses, producing additional points of focused radiation to heat the fluid. These structures may be multifacetive reflective elements positioned adjacent and partially about the respective lenses.

A passage may also be provided for directing a thermally insulating flow of fluid past the hemispherical passages, this insulating flow passage being upstream of the hemispherical passages to cause heat escaping from the hemispherical passages to be absorbed by the insulating flow and maintained within the system. The insulating flow passage may include a series of substantially flat annular fluid conduits positioned horizontally over the hemispherical passages at locations essentially about the lenses. A layer of heat insulating material may also be provided above the insulating flow passage to inhibit heat transfer between that conduit and the ambient air, the layer intersecting the lenses adjacent meridians thereof. The insulating flow passage and the hemispherical passages may be constructed and arranged to maintain the fluid in a pressurized state to prevent vaporization thereof, or may be constructed in a terraced fashion to permit a gravity induced flow of fluid downwardly through the insulating flow passage. In the latter case, the gravity induced flow also forces the fluid upwardly through the hemispherical passages.

The method of the present invention involves generally the method practiced by the above-described apparatus. Additional solar radiation may be reflected onto the spherical lenses as they are irradiated by the sun, causing more heat to be concentrated on the heat absorbing surfaces than is the case with direct irradiation alone.

The method of the present invention may also include the initial step of passing the fluid supplied to the system above the heat absorbing upper surfaces in a supplementary insulating flow, for absorption of heat escaping upwardly from the heated portions of the panel. The supply fluid is then passed through the hemispherical passages for further heating, carrying with it an amount of heat which would otherwise be lost from the system.

It is an object of the present invention to provide a solar heating panel and method to more efficiently capture the energy embodied in incident solar radiation and transfer the enery to a fluid in the form of heat.

It is another object of the present invention to provide a simple and inexpensive solar heating panel and method for maximizing the amount of solar energy captured and utilized throughout the daylight hours, irrespective of the position of the sun in the sky.

It is yet another object of the present invention to provide an inexpensive solar heating panel able to function over a long period of time with virtually no maintenance or attention.

The solar heating panel of the present invention efficiently converts incident solar radiation to thermal energy in a passing fluid by convergence of the incident radiation onto one or more upper boundary portions of a fluid passage. Because the upper surfaces of the upper boundary portions include the focal points of a plurality of exposed spherical lenses for solar radiation of various directions, incident solar radiation is converged on the upper boundary portions throughout the day. The points of convergence are heated to a temperature of between 300° and 500° Celsius, producing a tremendously high temperature differential between the upper boundary portions and the fluid flowing thereunder. Heat transfer between the upper boundary portions and the fluid adjacent the points of convergence is thus much more efficient than in prior devices.

Formation of the upper and lower boundary portions as interfitting hemispherical elements concentric with the respective spherical lenses also maximizes fluid turbulence within the passage means, further increasing the efficiency of heat transfer from the upper boundary portions to the passing fluid. Closure of the air spaces between the lenses and the upper boundary portions by an insulative glass plate engaging the lenses at meridians thereof reduces heat loss to the atmosphere and forms a "hot box" of retained thermal energy in intimate contact with each upper boundary portion of the fluid passage. The air within the hot boxes is maintained at a temperature of between 100° and 200° Celsius when the panel is exposed to the sun's rays, resulting in further substantial heat transfer to the passing fluid along the upper surface portions.

When the panel of the present invention is provided with upper and lower boundary portions each having a plurality of hemispherical elements and defining a single fluid passage coextensive with the boundary portions, water in the passage can typically be heated to overall temperatures up to 90° Celsius. The heating panels of the present invention involve no moving parts and are constructed in a simple manner to yield a product able to provide efficient service over an extended period of time.

The performance characteristics of the panel disclosed herein are further enhanced by reflecting additional solar radiation on the lenses and establishing a supplementary insulating flow of supply fluid above the heated portions of the panel. For these purposes, the boundary portions can be formed as separate hemispherical elements joined in pairs to define discrete fluid passages which are connected to form a parallel/series flow network of the type disclosed.

The reflection of additional solar radiation onto the lenses significantly increases the amount of solar energy entering the system and thus permits much higher fluid temperatures to be obtained. Sunlight directly incident on each lens is focused at a predetermined single point on the corresponding upper surface portion. This focal point of sunlight is unaffected by the reflection process and continues to make its thermal contribution. However, the light reflected onto the particular lens is also focused on the upper surface portion, producing at least one additional focal point of sunlight to heat the fluid passing beneath. The thermal contribution of the additional focal points is quite substantial and represents energy which otherwise would not impinge upon the lens. The heating capacity of each hemispherical passage is thus greatly increased, enabling fewer such passages to be used and substantially higher fluid temperatures to be obtained.

Optimal performance is achieved when a three-faceted reflective structure is disposed vertically behind each lens on the upper surface of the panel, producing as many as three additional focal points of sunlight on the particular boundary portion. The exact number of additional focal points per lens can vary during the day, but should never be less than one.

The insulating flow of supply fluid over the heated portions of the panel minimizes the amount of energy dissipated upwardly therefrom. Energy that would otherwise be lost from the system is absorbed by the previously unheated supply fluid and carried therewith into the hemispherical fluid passages. When a layer of heat insulating material is placed above the insulating flow, heat loss from the system is virtually eliminated.

With the aforementioned apparatus and method, water can be heated to temperatures as high as 100° Celsius at substantially atmospheric pressure. Water passing through the system receives heat from at least two points in each hemispherical passage, and is constantly mixed by the turbulent flow therein to maximize the temperature differential between the passage and the fluid at those points. Furthermore, temperatures approaching 150° Celsius are obtainable by pressurizing the water in the system to prevent vaporization.

BRIEF DESCRIPTION OF THE DRAWINGS

The above and other objects of the present invention may be more fully understood from the following detailed description taken together with the accompanying drawings, wherein similar reference characters refer to similar elements throughout, and in which.

DESCRIPTION OF THE PREFERRED EMBODIMENT

Figure 1:
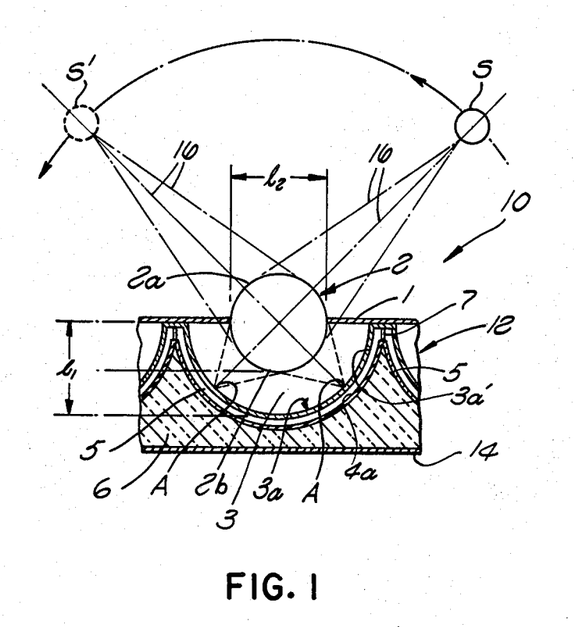
FIG. 1 is a fragmentary vertical sectional view illustrating a single heating cell of a first embodiment of the present invention, wherein the path of the sun across the sky is indicated somewhat diagramatically.
Figure 2:
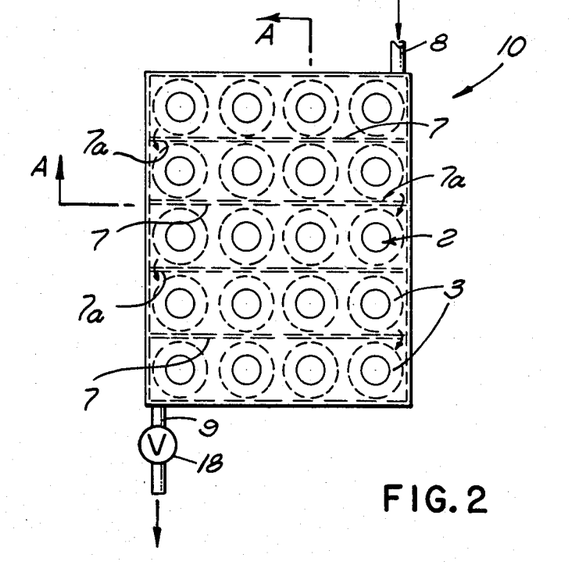
FIG. 2 is a top plan view of the embodiment of the present invention which incorporates the cell structure of FIG. 1.
Figure 3:
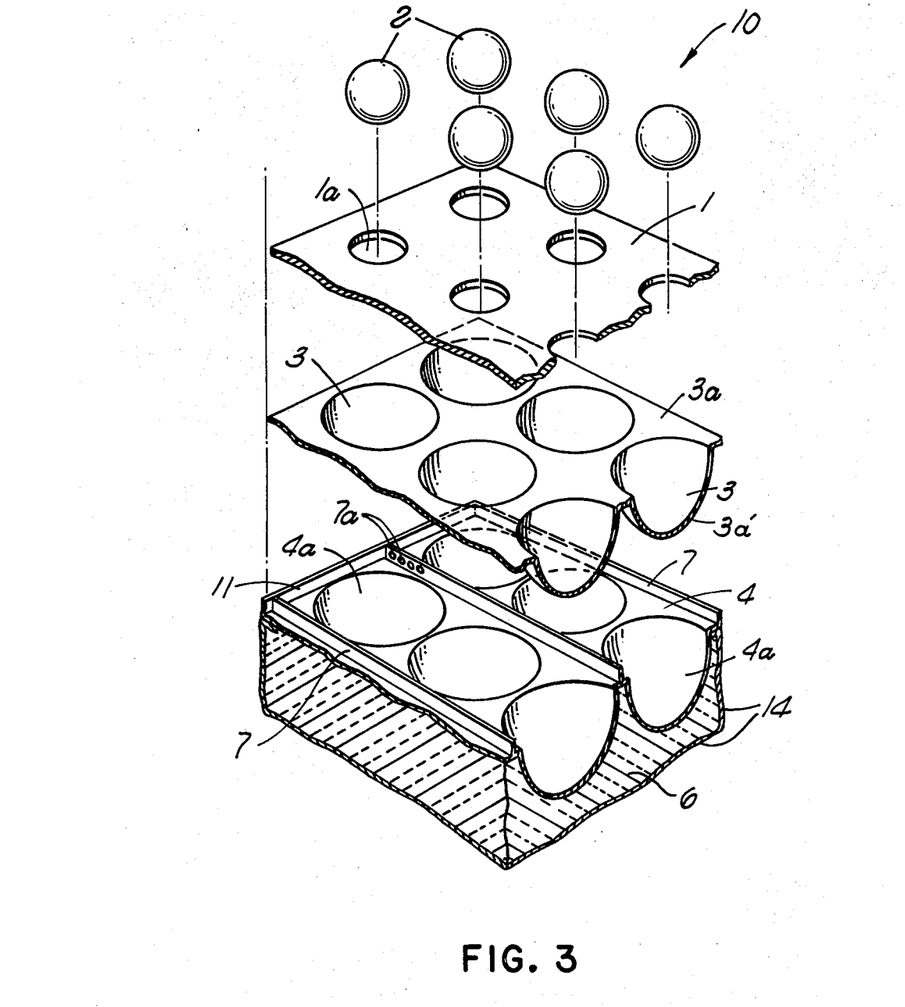
FIG. 3 is an exploded perspective view of the embodiment illustrated in FIG. 2, fragmented along the line AA.
Figure 4:
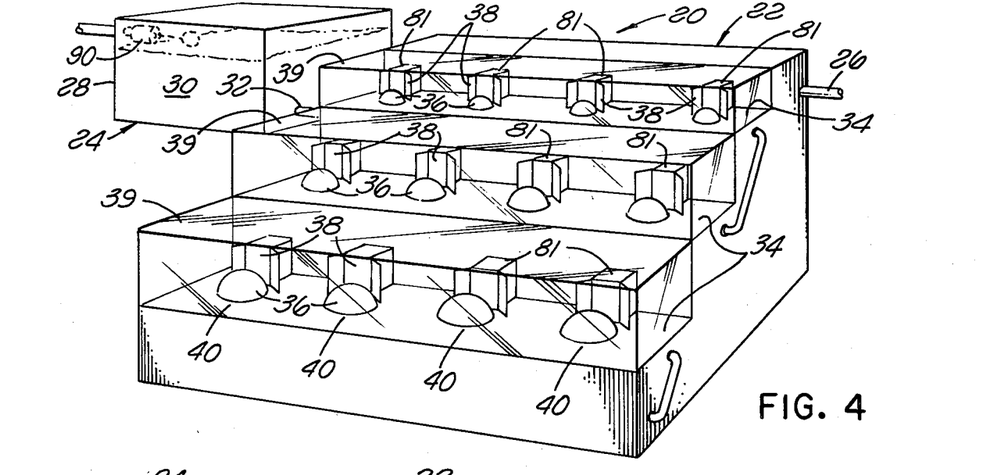
FIG. 4 is a perspective view illustrating a second embodiment of the present invention.

Referring now to the drawings, there is illustrated, in FIGS. 1, 2 and 3 thereof, a first embodiment of the present invention, generally designated 10. The embodiment 10 generally comprises a plurality of spherical lenses 2 held in position relative to a fluid passage apparatus 12 by a transparent upper plate 1.

The fluid passage apparatus 12 includes upper and lower boundary portions 3a and 4, respectively, interfitting with each other to form a relatively thin passage 5 therebetween. The boundary portions 3a and 4 are provided with similar arrays of hemispherical recess portions 3a' and 4a, respectively, concentric with the spherical lenses 2. The passage 5 is thus formed of a series of interconnected relatively thin hemispherical spaces. As shown most clearly in FIGS. 2 and 3, the passage 5 is divided into rows of the recess portions 3a' and 4a by parallel partitions 7 having openings 7a at alternating ends thereof. A single continuous fluid passage is thus formed within the embodiment 10. Fluid enters the passage 5 through the inlet 8 and travels a tortuous alternating path, as indicated in FIG. 2, through the various rows of hemispherical spaces forming the passage 5. Fluid reaching the end of the passage 5 is directed into an outlet 9 controlled by a valve 18. The thin tortuous path through the passage 5 creates substantial turbulence in the passing fluid, greatly enhancing mixture of the fluid.

The lower boundary portion 4 of the fluid passage apparatus 12 may be backed with a heat insulating material 6 to minimize the downward escape of heat from the fluid. Alternatively, the lower boundary portion 4 can be formed integrally with the heat insulating material 6 such that the upper surface of the lower boundary portion 4 is actually the surface of the insulating material. A skin 14 at the bottom and sides of the fluid passage apparatus 12 may be provided to act as a containment medium for the insulating material 6.

The transparent upper plate 1 extends across the top of the fluid passage apparatus 12 and is attached to the upper boundary portion 3a in a sealing relationship around each of the hemispherical recess portions 3a'. The upper plate 1 is provided with an array of circular openings 1a centered over the hemispherical recess portions 3a' for reception of the spherical lenses 2. The spherical lenses 2 are positioned within the openings 1a such that the upper plate 1 closely engages the lenses 2 along meridians of the lenses and is bonded thereto in air tight sealing relationship. The lenses 2 are thus concentric with the hemispherical recess portions 3a' with the upper halves 2a projecting above the upper plate 1 and the lower halves 2b extending downwardly therefrom to form hemispherical closed air spaces 3 between the lenses 2 and the upper boundary portion 3a.

In the preferred embodiment of the present invention, the radius $L_1$ of the hemispherical closed air spaces 3 may be equal to the focal distance from the centers of the respective spherical lenses 2. This distance will generally be somewhat less than the diameter $L_2$ of the spherical lenses. The focal points of the solar radiation incident on the spherical lenses 2 for the various relative positions of the sun are thus located on the upper surfaces of the hemispherical recess portions 3a'.

The various components of the embodiment 10 may be constructed of any suitable materials possessing the properties described above and able to withstand extreme temperatures, sustained contact with the fluid used, and prolonged ultraviolet irradiation from the sun. The spherical lenses 2 and the upper plate 1 may be made of glass or heat resistive synthetic resin, however, the plate 1 is preferably made of a heat blocking material such as heat insulative glass. Heat insulative glass has a large number of closed air cavitites therein for blocking the conduction of heat across the glass without interferring with the passage of light therethrough. The upper boundary portion 3a may be formed of plastic, metal or any other suitable material able to withstand temperatures in the range of 300° to 500° Celsius. The upper surface of the hemispherical recess portions 3a' of the upper boundary portion 3a may be coated with a heat absorptive material such as a special paint or metallic plate designed to absorb rather than reflect the majority of the infrared radiation incident thereon. The lower boundary portion 4 may also be made of any suitable material, but it need not have as high a resistance to deterioration from high temperatures since it is not exposed to the focused rays of the sun. As discussed above, the lower boundary portion 4 may simply comprise the upper surface of the body of heat insulating material 6 forming the base of the embodiment 10. The parallel partitions 7 may likewise be made of any suitable material which will not deteriorate from contact with the fluid or from exposure for prolonged periods of time to the temperature of the fluid.

The lenses 2 may be secured within the openings 1a of the upper plate 1 by any conventional means, such as a heat resistive cement compound. Likewise, the air tight seals between the upper plate 1 and the upper boundary portion 3a may be formed with cement or any other binding agent, as may the points of connection between the parallel partitions 7 and the two boundary portions 3a and 4.

In operation, the embodiment 10 is oriented in a manner causing the lenses 2 to receive light from the sun during the majority of the daylight hours. The sun is designated in FIG. 1 by the letter S and is shown diagrammatically tracing an arc in the indicated direction from the full line position S to the broken line position S', during which time it emits radiation designated 16. A portion of the radiation 16 is incident on each of the lenses 2 and is focused thereby at a point designated "A" on the light absorptive upper surface of the corresponding upper boundary portion 3a. The focused rays of the sun at the point A causes the upper boundary portion 3a to be heated at that point to a constant temperature of between 300° and 500° Celsius. The temperature differential is thus very high between the portion 3a at the point A and the water or other fluid within the passage 5 adjacent thereto, yielding a high rate of heat transfer between those elements. The fluid also travels through the passage 5 with substantial turbulence, effectively mixing the water to maintain the highest possible temperature differential and thus the highest possible rate of heat transfer at the point A. At the same time, the air confined within the hemispherical closed air space 3 is heated both by direct solar irradiation and the high temperature of the boundary portion 3a at the point A, causing the air to reach a temperature between 100° and 200° Celsius. The closed air space 3 thus acts as a "heat box" or a heat receiving compartment from which heat cannot easily escape upwardly through the glass plate 1 and can only pass through the boundary portion 3a to the fluid within the passage 5. Since the maximum temperature of the fluid is generally between 80° and 90° Celsius, a substantial temperature differential exists at all times between the air in the space 3 and the fluid. This temperature differential causes heat transfer through the entire hemispherical recess portion 3a' and produces a significant additional heating effect in the embodiment 10.

The embodiment 10 is thus extremely efficient and is able to heat water to temperatures up to 90° Celsius, whereas most conventional heating panels are unable to heat water above 70° C.

FIGS. 4 through 10 illustrate a second embodiment of the present invention, generally designated 20. The embodiment 20 generally comprises a panel arrangement 22 connected to a fluid supply 24 and having an outlet 26 for heated fluid.

The fluid supply 24 may include a tank 28 in which supply fluid 30 is maintained at a predetermined level. The tank 28 is connected to a fluid inlet of the panel arrangement 22 by a conduit 32 located below the level of fluid in the tank. Thus, the fluid 30 is supplied to the panel arrangement 22 at a constant pressure.

The panel arrangement 22 is provided with a plurality of horizontal steps or terraces 34 carrying a number of spherical lenses 36 and corresponding reflective structures or mirrors 38. Each of the steps also includes a transparent cover 39 to protect the lenses and mirrors and prevent dirt from accumulating thereon. In the configuration shown, each of the three steps 34 is provided with four spherical lenses 36, the lenses being arranged in four side by side rows 40 running from one step to the next. It will, of course, be understood that the numbers of steps and rows in the figures have been chosen solely for illustrative purposes. The exact number of these elements in a device of the type disclosed herein will depend upon a number of factors, including the amount of heated water required and the temperature to which the water is to be heated.

Referring now primarily to FIGS. 5 through 8, a thin hemispherical fluid passage 42 is formed directly beneath and concentrically with each of the lenses 36 by upper and lower boundary portions 44 and 46, respectively. The lower boundary portions 46 are formed as aligned hemispherical depressions in a series of lower plates 48 extending essentially along the steps 34 of the panel arrangement. The lower boundary portions 46 are thus arranged in rows corresponding to the rows 40 described above. The boundary portions in each such row are connected in series by conduits 50 joining the upper rim 52 of each boundary portion 46 with the lower end 54 of the next higher boundary portion. As seen most clearly in FIG. 7, the conduits 50 are preferably connected to the upper rims 52 of the lower boundary portions through enlarged transition sections 56.

The upper boundary portions 44 are similarly formed as hemispherical depressions in upper plates 58 which overlie the lower plates 48 to form the hemispherical passages 42. The flat portions of the upper and lower plates 58 and 48 are held together in sealing relationship by a plurality of screws or other fasteners 60. A yielding material 62 (FIG. 7) may be confined between the flat surfaces of the upper and lower plates to aid in forming a seal.

A series of thin annular conduits 64 are positioned horizontally above the hemispherical passages 42 and about the respective spherical lenses 36 for conduction of an insulating flow of supply fluid over the hemispherical passages and the air spaces 65 between the lenses and the other boundary portions 44. The annular conduits 64 are connected in series by short conduit sections 66 between annular passages on the same step of the panel arrangement and longer conduit sections 68 running from one step to the next. The first conduit 64 in the series is connected to the supply tank 28 through the connecting conduit 32 described above. The outer edge of each annular conduit 64 may be received within an annular groove 70 provided about the corresponding upper boundary portion 44 in one of the upper plates 58. Similarly, the short sections 66 between the annular conduits may be received within grooves 72 and 73 of the upper and lower plates 58 and 46, respectively. The annular conduits 64 and sections 66 are thus recessed into upper plates 58 to provide a substantially uniform surface, with the inner edges 74 of the conduits 64 generally abutting the spherical lenses 36.

Figure 5:
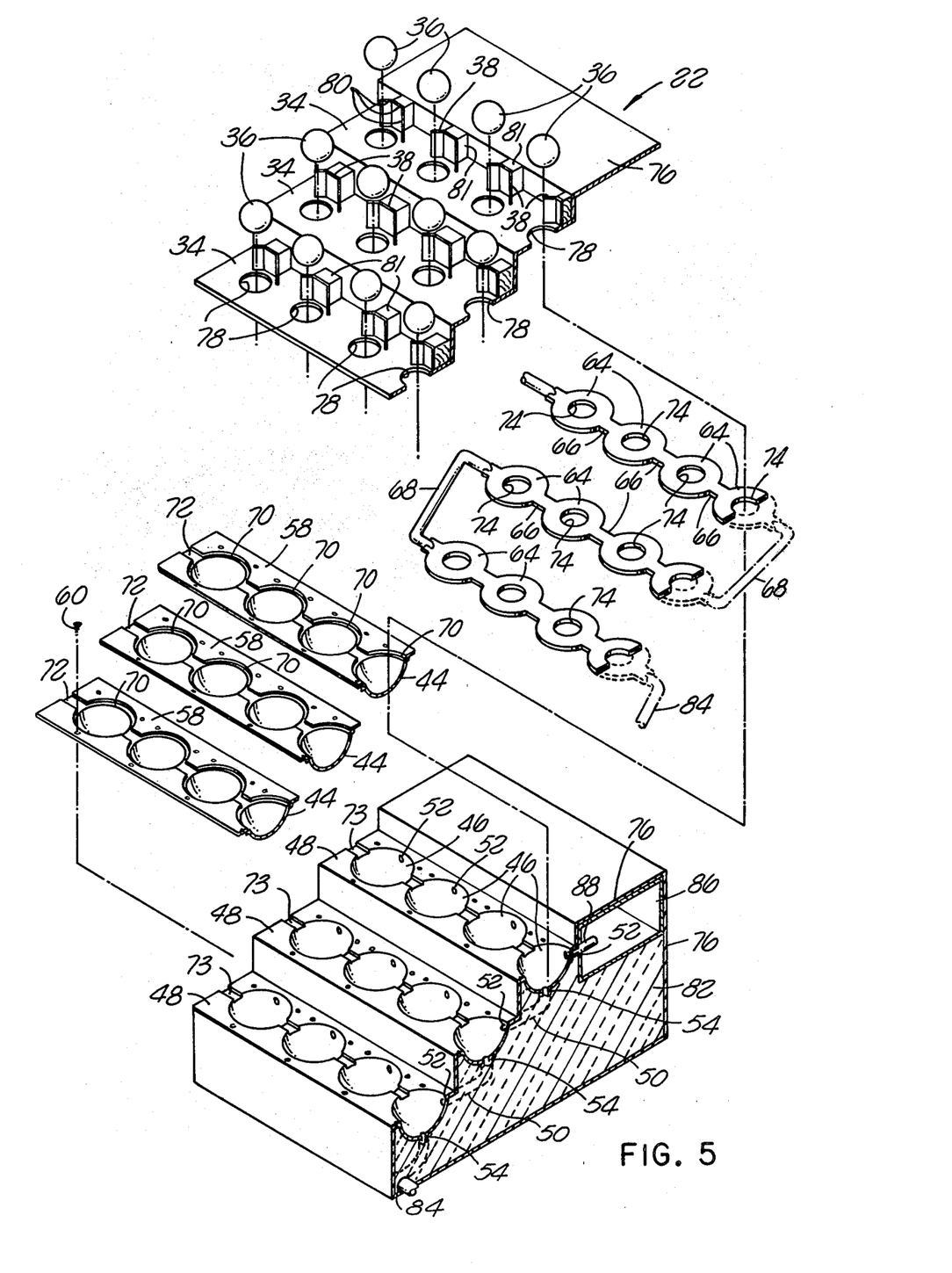
FIG. 5 is an exploded perspective view of a panel arrangement illustrated in FIG. 4, with the protective glass covers removed therefrom.

As shown in FIG. 5, the entire panel arrangement 22, except for the spherical lenses 36 and the reflective structures 38, is clad in a layer 76 of asbestos board or other suitable material. The layer 76 extends over the stepped portion of the panel arrangement 22, as well as the sides and bottom thereof. On the steps 34, the layer 76 extends to the lenses 36 and is bonded thereto along meridians of the lenses. Thus, the lenses 36 are supported within openings 78 of the layer 76 with the upper halves of the lenses exposed to sunlight.

The reflective structures 38 are multifaceted and extend partially about the respective lenses 36 along the rear thereof. As illustrated, each of the reflective structures has three facets formed by separate mirror sections 80 arranged vertically and contiguously about the rear edge of the corresponding lens, the central sections being anchored to the asbestos layer 76 through spacer blocks 81 which are preferably made of wood and are fixed to the asbestos layer 76. This configuration has been found to reflect the maximum amount of additional solar radiation onto each lens without obstructing the paths of radiation directly incident on the various lenses.

The base or core of the panel arrangement 22 is preferably a solid mass 82 of insulating material. The mass 82 can be a cellular material which has both substantial structural strength and good heat insulating properties. The mass 82 thus provides an insulating backing for the lower plates 48 and the lower hemispherical portions 46 thereof, as well as the conduits 50 and the other elements of the panel arrangement 22.

The fluid conductive path within the panel arrangement 22 is completed by a manifold 84 connecting the last annular conduit 64 in series with the hemispherical portions 46 at the lowest of the steps 34. The manifold 84 communicates with the lower ends 54 of the lower boundary portions 46. A tank 86 is provided adjacent the upper step 34 to receive fully heated fluid. The hemispherical passages 42 at the upper step are connected to the tank 86 by a plurality of conduits 88 extending outwardly from the upper rims thereof. Fully heated fluid from the hemispherical passages is thus permitted to flow through the conduits 88 to the tank 86 for eventual withdrawal through the outlet 26 described above.

Figure 6:
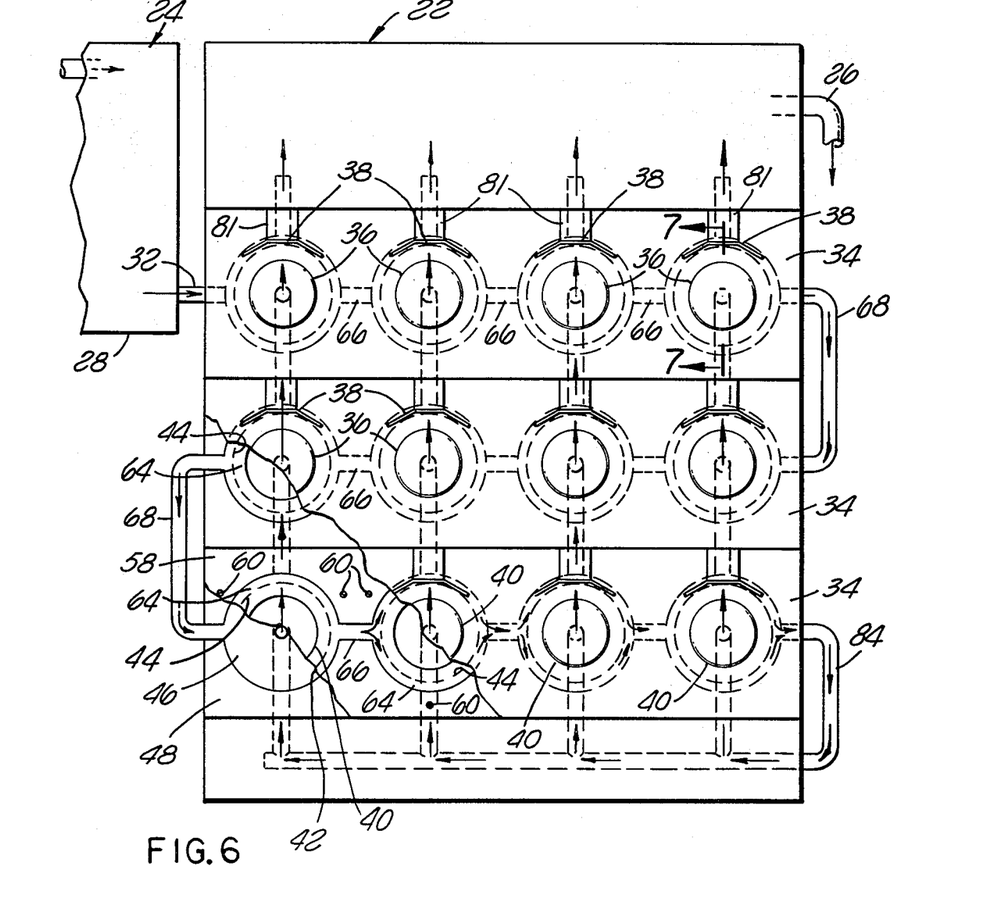
FIG. 6 is a top plan view of the embodiment of FIG. 4, partially broken away.
Figure 7:
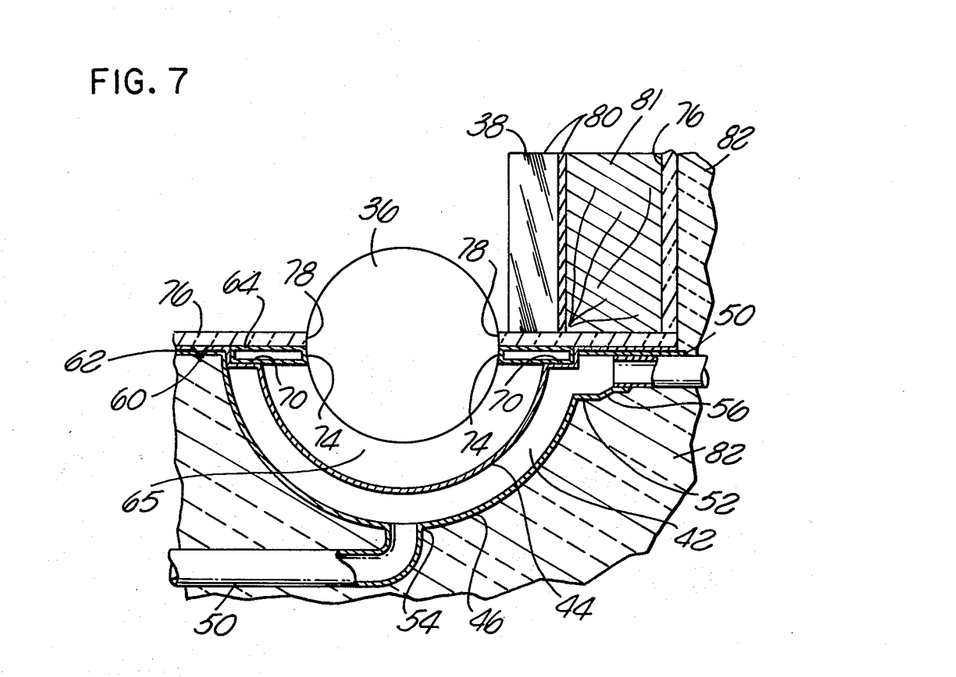
FIG. 7 is a fragmentary vertical sectional view of a single heating cell of the second embodiment of the present invention, taken along the line 7—7 of FIG. 6.
Figure 8:
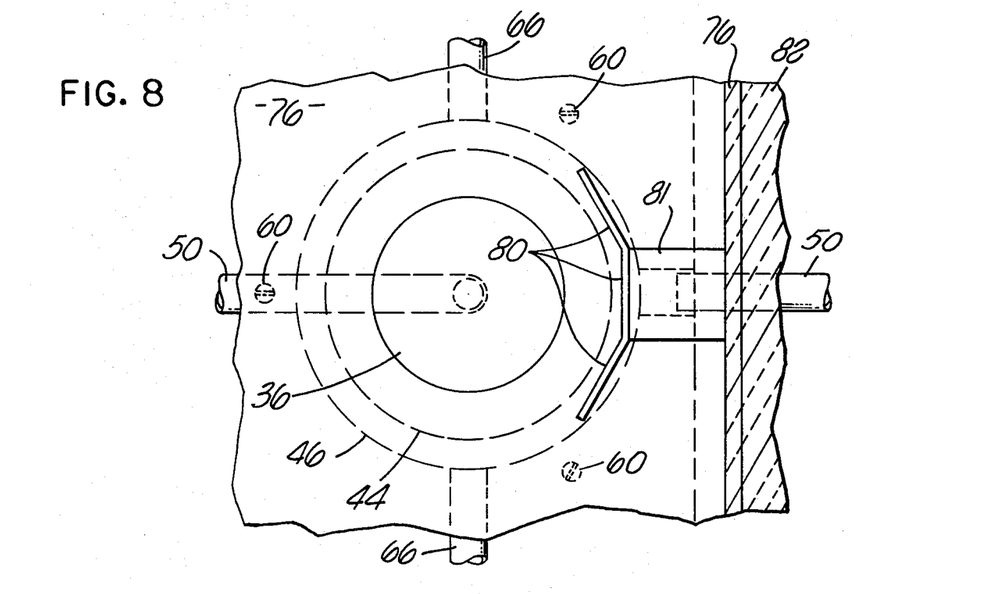
FIG. 8 is a fragmentary top plan view of the single heating cell of FIG. 7.

The path of fluid through the system as a whole can be seen most clearly in conjunction with FIG. 6. Supply fluid 30 enters the tank 24 and is maintained at a predetermined level by an automatic valve mechanism 90 shown schematically in FIG. 4. The fluid within the tank 24 is thus passed at constant fluid pressure through the series of thin annular conduits 64 as an insulating fluid flow 92. The insulating flow 92 proceeds in a zig zag fashion down the steps of the panel arrangement 22 until it reaches the end of the bottom step. At this point, the fluid 30 of the insulating flow 92 is passed through the array of hemispherical passages 42 as a principal heating flow 94. The principal flow 94 is a parallel flow directed upwardly along the various rows of hemispherical passages corresponding to the rows 40 of spherical lenses. The insulating flow 92 is in series with the principal heating flow 94 and located upstream thereof. Due to the configuration of the tank 24 and the series of annular conduits 64, the insulating flow 92 is gravity induced and can be sufficient to produce the principal flow 94 through the panel arrangement. This is true when the level 96 of supply fluid in the tank 24 is above the level of heated fluid within the tank 86. Static pressure produced by the effects of gravity on the fluid 30 in the system, in combination with the natural tendency of heated fluids to rise, is then sufficient to induce the flows 92 and 94 on a continuous basis. An outlet flow valve (not shown) may be placed in the outlet line 26 to regulate these flows.

Figure 9:
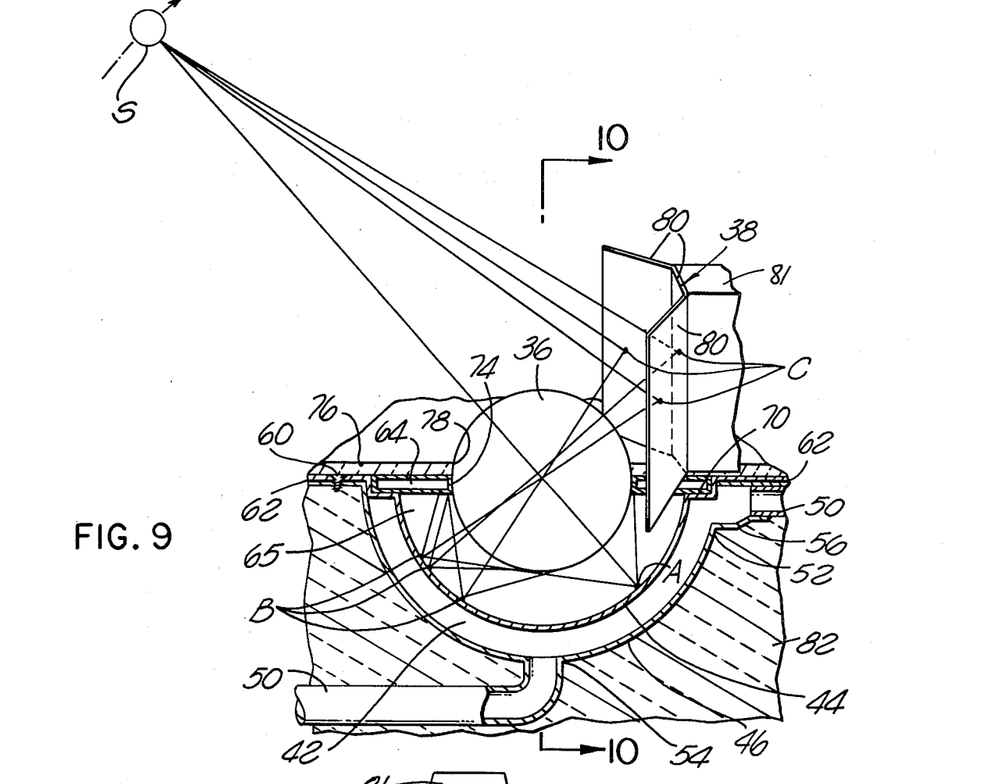
FIG. 9 is a vertical sectional view corresponding to FIG. 7, taken in perspective to more clearly show the optical paths of solar radiation transmitted by the corresponding spherical lens.
Figure 10:
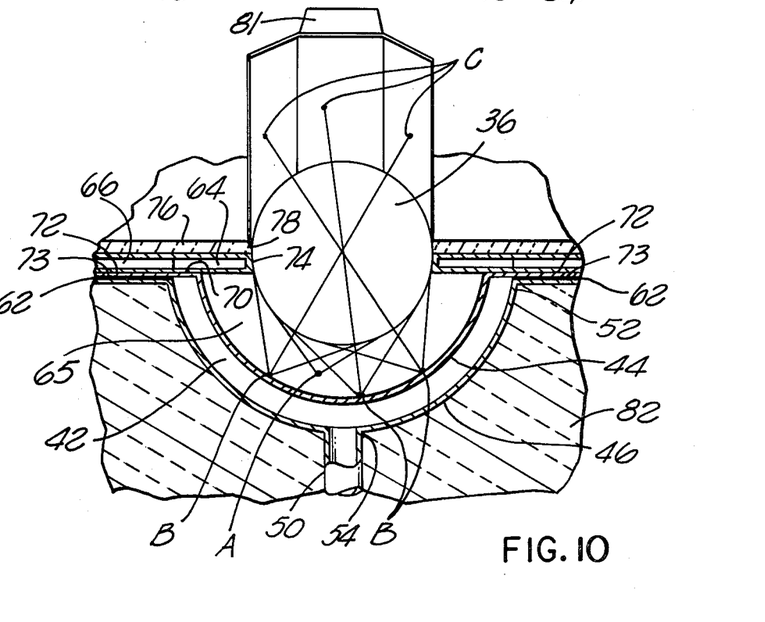
FIG. 10 is a vertical sectional view taken along the line 10—10 of FIG. 9, also in perspective.

As seen most clearly in FIGS. 9 and 10, radiation from the sun "S" is focused at a plurality of points on each of the upper boundary portions 44. The radiation directly incident on a particular lens 36 is focused at a point designated "A" on the boundary portion 44. The point A is essentially in line with the incident radiation, on the opposite side of the lens 39 from the sun.

During most of the day, additional solar radiation is reflected onto each lens 36 by one of the reflective structures 38 and is focused by the lens at one or more additional focal points "B" on the boundary portion 44. This additional radiation impinges upon one or more of the mirror sections 80 at areas "C" thereon and represents radiation which otherwise would not reach the lens 36. The total number of focal points on the boundary portion 44 during the hours of usable sunlight will vary from a minimum of two to a maximum of four. One of these points will be the point A of radiation directly incident on the particular lens 36, and the remaining one to three points will correspond to additional radiation focused onto the lens by the reflective structure 38.

It has been found that the device of the embodiment 20 yields four focal points per lens for approximately 1½ to 2 hours each day. Three focal points are then present for approximately 2 additional hours, and the number of points is reduced to two for the remaining 2 or more hours of usable sunlight. The location of the various focal points A and B on the boundary portion 44 will, of course, also vary over time as the relative position of the sun varies.

The various components of the embodiment 20 may be constructed of any of the materials described above for the corresponding components of the embodiment 10. Preferably, the upper boundary portions 44 of the hemispherical fluid passages will be made of copper sheet, while the lower boundary portions 46 and the conduits 50 will be made of either copper or a ferrous metal. The upper surfaces of the boundary portions 44 may be coated with a heat absorptive material similar to the coating described above in relation to the recess portions 3a' of the embodiment 10. The yielding material 62 may be a thin coating or gasket of rubber, neoprene or other suitable material between each pair of upper plates 58 and lower plates 48. The thin annular conduits 64 and the associated conduit sections 66 and 68 can likewise be made of either copper of a ferrous metal. The spherical lenses 36 may be made of glass or plastic, and may be held in place within the respective openings 78 by a suitable cement or adhesive compound (not shown). The solid mass 82 of insulating material may comprise a suitable foam material formed about the undersides of the lower plates 48, the conduits 50 and the manifold conduit 84. A number of commercially available plastic foam compositions can be foamed in placed about these elements to provide a barrier against the downward loss of heat from the system and serve as a base for the panel arrangement 22. The basic stepped or terraced configuration of the panel arrangement 22 can thus be simply and inexpensively provided by the mass 82.

In operation, supply fluid from the tank 28 is passed at constant pressure through the panel arrangement 22, as controlled by a valve (not shown) in the outlet conduit 26. The fluid 30 is initially passed along the steps 34 in the form of the insulating flow 92. During this time, the flow 92 acts as a barrier to heat transfer in an upward direction from the hemispherical fluid passages 42 and the air spaces 65. Heat which might otherwise be lost to the atmosphere is absorbed by the insulating flow 92 for reintroduction into the principal heated flow 94. The insulating flow 92 is thus gradually preheated to a temperature of between 30° and 40° Celsius as it progresses downwardly along the panel arrangement 22. Heat loss from the insulating flow itself is minimized by the insulating layer 76. The insulating flow 92, in combination with the insulating layer 76 and the insulating mass 82, virtually eliminates heat loss from the system.

Preheated fluid from the insulating flow 92 is conducted by the manifold 84 into the rows of hemispherical passages 42. The flow 92 is thus transformed into the principal flow 94 which is heated by the focal points A and B of solar radiation on the upper boundary portions 44. As described above in relation to the embodiment 10, the focal points are heated to temperatures between 300° and 500° Celsius and the temperature gradient from the focal points to the principal flow of fluid 94 is maximized by the turbulence of the flow. However, in this embodiment the focal points B are heated by additional focused radiation which impinges upon the lenses 36 solely by virtue of the reflective structures 38. This additional radiation represents a substantial increase in the amount of solar energy entering the panel arrangement 22, and all of the additional radiation is focused for efficient transfer to the fluid 30. Consequently, the fluid 30 may be heated to a significantly higher temperature using fewer stages or steps of hemispherical passages 42.

Although the panel arrangement shown in FIGS. 5 through 10 is provided with only three steps 34 of hemispherical passages 42, it will be understood that the embodiment 20 may comprise any number of steps of hemispherical passages depending upon the requirements of a particular installation. The optimum number of steps for most residential uses of the embodiment 20 is either four or five. It has been found that a heater of this type with four or five hemispherical passages in each row is able to heat water to approximately 100° C. Temperatures of this magnitude enable the water or other fluid heated by the embodiment 20 to power many conventional air conditioners, freezers and other cooling devices.

The number of rows 40 of spherical lenses and hemispherical passages will, of course, be determined by the quantity of heated water desired. A device having a greater number of rows 40 of hemispherical passages will have the capacity to produce heated fluid at a proportionately higher rate.

The various fluid passages within the panel arrangement 22 can also be constructed to maintain the fluid 30 in a pressurized state to prevent the fluid from vaporizing when it is heated to a very high temperature. Thus, the fluid passages can be constructed to withstand elevated internal pressures and valves can be provided at the inlet conduit and the outlet 26 to hold the fluid within the passages under pressure. This construction is particularly useful when the fluid to be heated is water, since additional steps of hemispherical passages can then be provided for superheating the water. In this manner, fluid temperatures on the order of 150° Celsius can be achieved.

As seen best in FIGS. 2 and 6, the embodiments 10 and 20 are easily adaptable for use with any system requiring a heated fluid by simply connecting them into the fluid circuit of the system through the inlets and outlet provided. The heated fluid may be used immediately or held for storage within an insulated vessel for use at a later time. In the case where the fluid to be heated is water in the plumbing system of a building, heated water may be collected in an insulated reservoir and withdrawn as the need for hot water arises.

It will be understood that, although the reflective structures 28 have been described only in relation to the embodiment 20, the teachings herein relative to reflective structures and the method of using them are applicable to any solar heating panel having spherical lenses. Thus, reflective structures similar to the elements 38 can be incorporated into the embodiment 10 with satisfactory results. Similarly, an insulating flow of supply fluid similar to the flow 92 described above can be set up in the apparatus of the embodiment 10 to minimize heat loss upwardly therefrom.

From the above, it can be seen that there has been provided an improved solar heating panel able to efficiently utilize incident solar radiation over the course of a day to heat a fluid such as water to a high temperature, without the need for moving the panel during the day to keep it aligned with the sun's rays. The panel is also inexpensive to manufacture and is possessed of a long operation life.

The appended claims are intended to cover all variations and adaptations falling within the true scope and spirit of the present invention.

I claim:
1. A solar heating panel arrangement comprising:
a plurality of spherical lenses for transmitting and focusing incident solar radiation;
fluid passage means having upper and lower boundary portions defining a series of relatively thin hemispherical fluid passages concentric with said lenses, respectively, said upper boundary portions being in heat transfer proximity to fluid flowing through the passages and having upper surfaces which include the focal points of the lenses for incident solar radiation of various directions; and
means for reflecting solar radiation onto the lenses for transmission to the upper boundary portions, said reflecting means including a plurality of multifaceted reflective structures each comprising three planar reflective portions arranged vertically about a portion of one of the lenses;
such that solar radiation is focused at a plurality of locations on each of said upper boundary portions to heat said fluid, one of said locations representing radiation directly incident on the corresponding lens and the other location or locations representing radiation reflected onto the lens by said reflecting means.

2. The solar heating panel arrangement recited in claim 1 wherein the three planar reflective portions are substantially contiguous with one another.

3. A solar heating panel arrangement comprising:
a plurality of spherical lenses for transmitting and focusing incident solar radiation;
fluid passage means having upper and lower boundary portions defining a series of relatively thin hemispherical fluid passages concentric with said lenses, respectively, and establishing an air space between each of the lenses and the respective upper boundary portion, said upper boundary portions being in heat transfer proximity to fluid flowing through the passages and having upper surfaces which include the focal points of the lenses for incident solar radiation of various directions;
means for reflecting solar radiation onto the lenses for transmission to the upper boundary portions; and
means for producing a thermally insulating flow of said fluid past the passage means, the insulating flow means being upstream of the passage means and including a series of substantially planar annular fluid conduits positioned horizontally over the passage means and the air spaces at locations substantially about the lenses;
such that solar radiation is focused at a plurality of locations on each of the upper boundary portions to heat the fluid, one of said locations representing radiation directly incident on the corresponding lens and the other location or locations representing radiation reflected onto the lens by the reflecting means, and heat escaping from the passage means is absorbed by the fluid and carried thereby into the passage means.

4. The solar heating panel arrangement recited in claim 3 which includes a layer of heat insulating material located above the series of substantially planar fluid conduits to inhibit heat transfer between the conduits and the ambient air, the layer of insulating material intersecting the lenses adjacent meridians thereof.

5. The solar heating panel arrangement recited in claim 4 wherein the lenses are bonded to the layer of insulating material.

6. The solar heating panel arrangement recited in claim 5 wherein the layer of insulating material is asbestos board.

7. The solar heating panel arrangement recited in claim 3 wherein the conduits are connected in series with each other and with the fluid passage means.

8. The solar heating panel arrangement recited in claim 7 wherein said insulating flow means and said fluid passage means are constructed and arranged to maintain the fluid in a pressurized state to prevent vaporization of the fluid when high fluid temperatures are achieved.

9. The solar heating panel arrangement recited in claim 7 wherein the hemispherical fluid passages are arranged in terraced fashion with a plurality of rows of the passages running up the terraces.

10. The solar heating panel arrangement recited in claim 9 wherein each of the rows comprises at least four of the passages.

11. The solar heating panel arrangement recited in claim 9 wherein the passages within each of the rows are connected in series, and the rows are connected in parallel with each other.

12. The solar heating panel arrangement recited in claim 11 wherein the insulating flow means is constructed and arranged to permit a gravity induced flow of the fluid in a generally downward direction through the series of conduits, said gravity induced flow forcing the fluid upwardly through the rows of hemispherical passages.

13. The solar heating panel arrangement recited in claim 12 wherein each of the hemispherical fluid passages has an upper rim and a lower end and is provided with a fluid inlet and a fluid outlet for connecting the passages in series, the fluid inlet extending upwardly into the lower end and the fluid outlet extending outwardly from a point on the upper rim.

14. A solar heating panel arrangement comprising:
a plurality of spherical lenses for transmitting and focusing solar radiation;
fluid passage means having a plurality of upper and lower boundary portions defining a series of relatively thin hemispherical fluid passages concentric with said lenses, respectively, and establishing an air space between each of the lenses and the respective upper boundary portion, said upper boundary portions being in heat transfer proximity to fluid flowing through the passages and having upper surfaces which include the focal points of the lenses for incident solar radiation of various directions;
such that solar radiation incident on the lenses is focused on the upper surfaces to heat the fluid within the passage means; and
means for producing a thermally insulating flow of the fluid past the passage means, the insulating flow means being upstream of the passage means and including a series of substantially planar annular fluid conduits positioned horizontally over the passage means and the air spaces at locations substantially about the lenses, to cause heat escaping from the passage means to be absorbed by the fluid and carried thereby into the passage means.

15. The solar heating panel arrangement recited in claim 14 which includes a layer of heat insulating material located above the series of substantially planar fluid conduits to inhibit heat transfer between the conduits and the ambient air, the layer of insulating material intersecting the lenses adjacent meridians thereof.

16. The solar heating panel arrangement recited in claim 15 wherein the lenses are bonded to the layer of insulating material.

17. The solar heating panel arrangement recited in claim 16 wherein the layer of insulating material is asbestos board.

18. The solar heating panel arrangement recited in claim 14 wherein the annular fluid conduits are connected in series with each other and with the fluid passage means.

19. The solar heating panel arrangement recited in claim 18 wherein the insulating flow means and the fluid passage means are constructed and arranged to maintain the fluid in a pressurized state to prevent vaporization of the fluid when high fluid temperatures are achieved.

20. The solar heating panel arrangement recited in claim 18 wherein the hemispherical fluid passages are arranged in terraced fashion with a plurality of rows of the passages running up the terraces.

21. The solar heating panel arrangement recited in claim 20 wherein each of said rows comprises at least four of the passages.

22. The solar heating panel arrangement recited in claim 20 wherein the passages within each of the rows are connected in series, and the rows are connected in parallel with each other.

23. The solar heating panel arrangement recited in claim 22 wherein the insulating flow means is constructed and arranged to permit a gravity induced flow of the fluid in a generally downward direction through the series of conduits, said gravity induced flow forcing the fluid upwardly through the rows of hemispherical passages.

24. The solar heating panel arrangement recited in claim 23 wherein each of the hemispherical fluid passages has an upper rim and a lower end and is provided with a fluid inlet and a fluid outlet for connecting the passages in series, the fluid inlet extending upwardly into the lower end and the fluid outlet extending outwardly from a point on the upper rim.

* * * * *

UNITED STATES PATENT AND TRADEMARK OFFICE
CERTIFICATE OF CORRECTION

PATENT NO. : 4392482
DATED      : July 12, 1983
INVENTOR(S) : Moo K. Chang

It is certified that error appears in the above-identified patent and that said Letters Patent are hereby corrected as shown below:

Column 1, line 18    "fo" should be --for--.

Column 3, line 8     "enery" should be --energy--.

Column 9, line 41    "39" should be --36--.

Column 11, line 21    "conduit and" should be --conduit 32 and--.

Signed and Sealed this

Thirteenth Day of December 1983

[SEAL]

Attest:

GERALD J. MOSSINGHOFF

Attesting Officer      Commissioner of Patents and Trademarks